Patented Oct. 4, 1949

2,483,499

UNITED STATES PATENT OFFICE 2,483,499

LUBE OIL ADDITIVES AND PREPARATION THEREOF

Eugene Lieber, New York, N. Y., and Aloysius F. Cashman, Bayonne, N. J., assignors to Standard Oil Development Company, a corporation of Delaware No Drawing. Application December 8, 1944, Serial No. 567,312

10 Claims. (Cl. 260—607)

This invention relates to a new type of lubricating oil additive and methods of preparing same, and more particularly to organic condensation products containing sulfur and having both extreme pressure lubricating properties and also pour-depressing properties.

Broadly, the invention comprises reacting thiourea with halogenated organic compounds and using the resulting reaction product per se or converting them by further reaction into various other derivatives.

Thiourea which is one of the primary reactants of this invention has the graphic formula

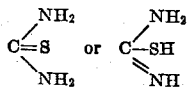

Instead of using this exact compound, one may use various derivatives thereof, such as those in which one or more, but not more than 3, of the amino hydrogen atoms is replaced by an organic radical, especially a hydrocarbon group such as an alkyl group, e. g., methyl, ethyl, isopropyl, n-butyl, tertiary butyl, etc., or an aryl group such as phenyl, naphthyl, or mixed alkyl-aryl groups, such as tolyl, amyl-phenyl, benzyl, etc.

The other primary reactant of this invention is a halogenated organic compound which may be represented broadly by the general formula R—X, where R is an aliphatic hydrocarbon group, e. g., one derived from a relatively pure hydrocarbon compound such as octane, decane, cetane, octadecane, etc., or one derived from hydrocarbon mixtures, such as petroleum hydrocarbons, e. g., paraffin wax, especially paraffin wax having a melting point of at least 140° F., high melting point petrolatum, kerosene, naphtha, lubricating oil, etc., or an organic compound containing an aliphatic hydrocarbon group, e. g., benzyl, naphthenyl, phenyl octadecyl, etc., or groups derived from other types of aliphatic organic materials, such as natural fatty substances, e. g., beef fat, mutton tallow, non-drying vegetable oil, etc., and X represents one or more halogen atoms attached to R through aliphatic carbon atoms.

The reaction of the two primary reactants of this invention, e. g., a thiourea with the halogenated aliphatic compound, may be represented in a general way by the following equation in which, for the sake of simple illustration, thiourea is used per se and the formula R—Cl represents a chlorinated aliphatic hydrocarbon:

H₂N—C(S)—NH₂ + R—Cl →
[H₂N—C(SR)=NH]HCl

In carrying out this reaction, the halogenated aliphatic material, such as chlorinated paraffin wax, and the thiourea are refluxed in a solvent which may be of several types of which the alcohols, e. g., butyl alcohol, are preferred. If chlorinated wax is used, the reaction product may be considered to have the graphic formula:

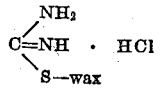

One object of this invention is to convert the above-described primary reaction product or the slight modifications thereof into secondary reaction products by one or more further chemical reactions.

One major chemical conversion to which the primary reaction products of this invention may be subjected involves their treatment with water and halogen in order to produce sulfonyl halides, according to the general equation

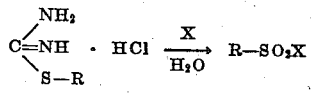

These organic sulfonyl halides may be represented by the generic formula (Y)ₙ—R—(SO₂X)ₘ where R is a derived organic radical, such as a hydrocarbon radical derived from paraffin wax, kerosene, or other petroleum fraction or other hydrocarbon radical; Y is a substituent radical, e. g., halogen, nitro, carboxyl, carbalkoxyl, etheramino, amido, hydroxy, keto, etc.; X is a halogen (preferably) chlorine; and m and n are integers which may be one or more. As a specific example, a wax sulfonyl chloride, derived from chlorinated paraffin wax and thiourea as primary reactants and subsequent treatment with water and chlorine, will have the general formula:

Wax—SO₂—Cl

These derivatives per se are valuable lube oil additives, being capable of depressing the pour point of a waxy lube oil while at the same time increasing the load carrying capacity thereof, as will be shown by experimental data in one of the examples herebelow.

By proper adjustment of the chlorine content of the original chlorinated paraffin wax, and/or the amount of chlorination in the secondary conversion reaction, the corresponding chlorinated derivatives of such sulfonyl chlorides may be obtained, as for instance, chloro wax sulfonyl chloride which may be represented by the general formula:

Cl—Wax—SO₂Cl

Such products are not only powerful pour depressors but also are good extreme pressure additives which are stable under conditions of high temperature use.

Somewhat similar organic sulfonyl halides may be made by treating the organic raw material, e. g., paraffin wax, kerosene, etc. with sulfur dioxide and halogen, e. g., $Cl_2$.

However, surprisingly still better results are obtained if one replaces the halogen atom of the sulfonyl halide radical, whereby the sulfonyl halide may be converted into other derivatives by reaction with aromatic compounds in the presence of suitable catalysts, using for the sake of illustration the wax sulfonyl chloride as the substance to be converted into the various corresponding derivatives as shown by the equation:

$$Wax\text{---}SO_2\text{---}Cl + Ar \xrightarrow{AlCl_3} Wax\text{---}SO_2\text{---}Ar$$

Specifically in the case of naphthalene as the aromatic compound, the simplest conversion product would be represented by the general formula:

$$Wax\text{---}SO_2\text{---}C_{10}H_7$$

In addition to the above simple or monomeric condensation product, higher molecular weight polymeric sulfone compounds are obtained. For instance, naphthalene diwax sulfone having the formula $C_{10}H_6(wax\text{---}SO_2)_2$, naphthalene triwax sulfone having the formula $C_{10}H_5(wax\text{---}SO_2\text{---})_3$, or more generically naphthalene polywax sulfones having the general formula $$C_{10}H_{8-n}(wax\text{---}SO_2\text{---})_n$$

where $n$=at least 2. More broadly if the wax or other hydrocarbon group used instead thereof is represented by R, and the naphthalene or other aromatic group is represented by Ar, the generic formula is $Ar(R\text{---}SO_2\text{---})_n$.

High molecular weight polysulfones having a chain-like structure with alternate wax and naphthalene groups interlinked by $SO_2$ groups can also be formed, particularly when reacting the naphthalene with a chlorwax sulfonyl chloride or with a wax disulfonyl chloride. Such polysulfones may have the formula for instance:

$$XR\text{---}SO_2\text{---}Ar\text{---}(R\text{---}SO_2\text{---}Ar)_nR\text{---}SO_2\text{---}Ar$$

where X represents a residual halogen atom which may be left in the molecule or removed as desired, R represents an aliphatic group such as one derived from paraffin wax, petrolatum, etc., Ar represents an aromatic nucleus such as naphthalene and the like and $n$ represents an integer of one or more indicating the number of polymeric units represented within the parenthesis. Specifically if such a product is made from chlorwax sulfonyl chloride and naphthalene, the polysulfones would have the formula:

$$Cl\ wax\text{---}SO_2\text{---}C_{10}H_6\text{---}$$
$$(wax\text{---}SO_2\text{---}C_{10}H_6)_n\text{---}wax\ SO_2\text{---}C_{10}H_8$$

If aliphatic di- or other poly-aliphatic sulfonyl halides are used as raw material to be reacted with the aromatic compound, the polysulfones will have a formula of the following general type:

$$Ar\text{---}SO_2\text{---}R\text{---}SO_2\text{---}Ar\text{---}$$
$$(SO_2\text{---}R\text{---}SO_2\text{---}Ar)_n\text{---}SO_2\text{---}R\text{---}SO_2\text{---}Ar$$

in which R and Ar have the same meanings as above. Specifically when starting with a wax disulfonyl chloride and naphthalene the polywax naphthalene sulfones may be represented by the general formula:

$$C_{10}H_7\text{---}SO_2\text{---}wax\text{---}SO_2\text{---}C_{10}H_6(SO_2\text{---}$$
$$wax\text{---}SO_2\text{---}C_{10}H_6)_n\text{---}SO_2\text{---}wax\text{---}SO_2\text{---}C_{10}H_8$$

Although naphthalene is preferred as the aromatic compound to be reacted with the hydrocarbon sulfonyl halide according to this invention, other aromatic compounds may be used, for instance, hydrocarbons such as anthracene, phenanthrene, coal tar aromatic compounds, or other condensed polynuclear aromatic compounds which may or may not contain one or more methyl, ethyl, or higher alkyl constituents, or even simpler aromatic compounds such as benzene, toluene, xylene, amyl benzene, diphenyl, etc. Aromatic hydroxy compounds may also be used such as phenols, cresols, amyl phenols, mixed petroleum phenols, such as those derived from a cracked gas oil fraction and which have a composition somewhat approximating a butyl phenol, or other compounds such as alpha-naphthol, beta-naphthol and the like. Amino aromatic compounds may also be used such as aniline, xylidene, naphthalamine, etc.

The proportions in which the aromatic compound and the aliphatic sulfonyl halide should be reacted together, will depend to some extent upon the nature of the raw materials, particularly the aliphatic sulfonyl halide, and upon the nature and molecular weight of the products desired. In general, however, about 1 to 10 parts, preferably 2 to 8 parts, by weight of aliphatic sulfonyl halide should be used per 1 part by weight of aromatic compound. If high molecular weight chain-type polysulfones are desired, it is preferable to use a higher proportion of the aliphatic material such as 5 to 10 parts by weight of the aliphatic sulfonyl halide to 1 part of the aromatic compound.

It is preferable, although only optional, to use an inert diluent or solvent during the reaction. Suitable materials include refined heavy naphtha or kerosene consisting essentially of saturated paraffinic or naphthenic hydrocarbons, or chlorinated solvents such as tetrachlorethane, etc. The amount of solvent, if used, should generally be about 1 to 5 volumes of solvent per volume of mixture of reactant.

In order to effect the chemical reaction it is preferred to use a Friedel-Craft type of catalyst such as aluminum chloride, boron fluoride, stannic chloride, etc., although aluminum chloride is preferred. The amount of catalyst to be used should generally be about 4 to 0.3 parts by weight of catalyst per 1 part by weight of aromatic compound.

In carrying out the reaction it is preferable to mix the two reactants together with a solvent if one is used, gradually add the catalyst at room temperature, and finally heat the reaction mixture to a temperature of about 100 to 400° F. to insure completion of the chemical condensation. The time of such heating may be about 1 to 8 hours.

After the condensation has been completed, residual catalyst is hydrolyzed by addition of water, alcohol, or aqueous or alcoholic caustic soda solution, after which the reaction mixture is separated into two layers as by settling or centrifuging in order to separate the organic reaction product from the inorganic catalyst sludge layer. The organic reaction products are then preferably subjected to distillation under reduced pressure such as fire and steam distillation up to at least 500, preferably up to 600° F., or vacuum distillation at an absolute pressure of about 1 to 20 mm. mercury to a temperature of at least about 400° F. and preferably 500° F., the desired condensation product being left as distillation residue.

The condensation products thus obtained generally consist of a mixture of different polymeric sulfone compounds, which may not only have the different types of structure illustrated above, but may also have various molecular weights ranging from about 500 to 5000 depending partly on the proportions of reactants, the amount of catalyst, and the combination of temperature and time. These condensation products are soluble in mineral oils, and have superior pour depressing potency when added to waxy mineral lubricating oils in small concentrations such as from 0.1% to 2% or so. They may be used in even larger concentrations up to 5 or 10% or so, particularly when it is desired to make use of the lubricity-improving characteristics of the sulfone group as present in the condensation product.

It will be apparent to those skilled in the art that many other variations can be made which come within the broader scope of the invention.

The objects, advantages, and details of the invention will be better understood from a consideration of the following specific examples.

A series of three tests was made in which a wax sulfonyl chloride containing 6.9% sulfur and 10.3% chlorine which had been prepared by reacting chlorinated paraffin wax having a melting point of about 120° F. with thiourea and subsequent treatment with chlorine in the presence of water, was dissolved in 300 cc. of tetrachlorethane as solvent, then an aromatic compound was also dissolved in the resultant mixture, and aluminum chloride was gradually added at room temperature, and then the mixture was heated to about 212° F. and maintained at such temperature for about 2 hours to insure completion of the reaction. Residual catalyst was then hydrolyzed by adding 100 cc. 91% isopropanol + 300 cc. H2O and settling, after which the organic solvent layer was subjected to distillation under reduced pressure to remove solvents and any low boiling reaction products. The desired product left as distillation residue was a black oil having a 0+ Robinson color, and good solubility in waxy mineral lubricating oils. The pour depressing potency of this condensation product was tested by dissolving small amounts thereof in a paraffinic lubricating oil having a viscosity of about 150 seconds Saybolt at 100° F., and having a pour point of +25° F. The pour points of the resultant blends were then determined. The proportions of raw materials used, the yield, and pour point data are given in the following table:

TABLE I

*Pour depressants by condensation of wax-sulfonyl halides with aromatics—"wax-aryl-sulfones"*

| Test | Reagents | | | | Yield | ASTM Pour Test,[1] °F. | | |
|---|---|---|---|---|---|---|---|---|
| | Wax-Sulfonyl Chloride, Gms. | Aromatic | Gms. Used | AlCl3 | | 0.50% | 0.75% | 1.0% |
| 1 | 100 | Naphthalene | 15 | 25 | [2] 91 | −15 | −20 | −20 |
| 2 | 100 | Diphenyl | 15 | 25 | [2] 95 | +10 | +10 | +5 |
| 3 | 200 | Naphthalene | 30 | 50 | [3] 124 | −20 | −30 | [4] −35 |

[1] Pour point of original test oil is +25° F.
[2] By vacuum dist. at 10 mm. Hg pressure to about 450° F. vapor temperature.
[3] By fire and steam dist. to 600° F.
[4] Better than −35° F. pour.

The above data show that the high molecular weight condensation products, i. e. polymeric sulfone compounds, obtained by condensation of paraffin wax sulfonyl chloride with low molecular weight monomeric aromatic compounds are good pour depressors for waxy mineral lubricating oils. The products obtained when using a condensed polynuclear aromatic compound such as naphthalene, are extremely potent.

The following additional example shows the application of the invention to the condensation of an aromatic compound such as naphthalene with a wax sulfonyl chloride made by the treatment of paraffin wax with sulfur dioxide and chlorine.

408 gms. of 115° F. end melting point semi-refined paraffin wax was placed in a lime glass reactor equipped with a fritted glass diffusion cup and a gas outlet and thermometer. A mixture of SO2 and Cl2 was led into the molten wax through the diffusion cup. The SO2/Cl2 ratio was maintained fairly close to 2.0. Reaction temperature was held between 120° F. and 160° F. At the end of 6 hours reaction time the material had gained 110 gms. weight. It retained its waxy nature and had a pale yellow tinge when melted. A. P. I. gravity at 150° F. had changed from 51.5 to 23.5. The resultant wax sulfonyl chloride contained 5.6% sulfur and 10.2% chlorine. In carrying out the subsequent condensation of the wax sulfonyl chloride with naphthalene, the following proportions of materials were used:

Wax sulfonyl chloride (#57–68) ____grams__ 200
Naphthalene _____do____ 30
o-Dichlorobenzene (solvent) _____cubic centimeters__ 50
AlCl3 _____grams__ 6

The wax sulfonyl chloride was added last to the vigorously agitating mixture in 7 equal shots at 5 minute intervals over a period of 30 minutes at a temperature of 125° F. Agitation was continued for 4 hours at 125° F. The reaction mixture was diluted with 1 liter of refined heavy naphtha. The catalyst was decomposed with 100 cc. of 50% aqueous NaOH, and 200 cc. of 91% isopropanol was added to prevent emulsion. The mixture was settled, and the oily layer was withdrawn and stripped by fire and steam to 600° F., yielding as residue 115 gms. of black oil consisting essentially of a high molecular weight polymeric wax-naphthalene sulfone. When tested in two different wax mineral lubricating oil base stocks, it showed the following pour depressing characteristics:

| Concentration | A. S. T. M. Pour Point Data | |
|---|---|---|
| | Manchester Spindle Oil | 1 Part Manchester Spindle, 1 Part Bright Stock |
| | °F. | |
| 0.00 | +30 | +25 |
| 0.25 | +10 | +15 |
| 0.5 | 0 | +10 |
| 1.0 | +10 | 0 |

These data indicate that the wax-naphthalene sulfone made from a wax sulfonyl chloride derived by treating paraffin wax with sulfur dioxide and chlorine has substantial pour depressing properties, although it is not as effective as the wax-naphthalene sulfones made from a wax sulfonyl chloride which had been prepared by reacting chlorinated paraffin wax with thiourea and subsequent treatment with chlorine in the presence of water.

This application is a continuation-in-part of copending application Ser. No. 471,014, filed Jan. 1, 1943, now Patent No. 2,459,440.

While it has been designated that the various derivatives of wax sulfonyl chloride have a monomeric structure, it should be kept in mind that these products effectively may be polymeric in structure.

It is thus apparent that the present invention opens up vast new fields for the chemical manufacture of valuable lubricating oil additives by making possible the production of new additives having pour-depressing properties as well as other properties, such as extreme pressure lubricating characteristics, anti-oxidant properties, detergent characteristics, etc.

It is not intended that this invention be limited to the specific examples which have been given merely for the sake of illustration, nor unnecessarily by any theories which have been suggested as to the mechanism of the operation of the invention, but only by the appended claims in which it is intended to claim all novelty inherent in the invention as well as all modifications coming within the scope and spirit of the invention.

We claim:

1. The process which comprises reacting a paraffin wax sulfonyl chloride having at least two chlorine atoms with a monomeric condensed polynuclear aromatic hydrocarbon in the presence of a Friedel-Craft catalyst, using a final reaction temperature of about 100° to 400° F., to produce high molecular weight polymeric sulfone compounds, hydrolyzing and removing residual catalyst, and distilling the reaction products under reduced pressure to obtain the desired condensation product as distillation residue.

2. Process according to claim 1 in which naphthalene is the aromatic compound used.

3. Process according to claim 1 in which the wax sulfonyl chloride is derived from a paraffin wax having a melting point of at least 120° F.

4. Process according to claim 1 in which the wax sulfonyl chloride used has a chlorine content of at least about 10%.

5. The process which comprises reacting a paraffin wax sulfonyl chloride containing about 6 to 8% sulfur and about 8 to 12% chlorine with naphthalene in the presence of aluminum chloride, using a final reaction temperature of about 200 to 220° F., hydrolyzing and removing the catalyst, and distilling the reaction product up to about 450° F. under reduced pressure at least as low as about 10 mm. mercury absolute pressure, to recover a high molecular weight condensation product as distillation residue.

6. Process according to claim 5 using about 200 parts by weight of the wax sulfonyl chloride, about 30 parts by weight of naphthalene and about 50 parts by weight of aluminum chloride, and carrying out the reaction in the presence of an inert solvent.

7. The process which comprises condensing a chlorinated paraffin wax sulfonyl chloride with a monomeric condensed polynuclear aromatic hydrocarbon in the presence of a Friedel-Craft catalyst, using a final reaction temperature of about 100 to 400° F., to produce a polymeric sulfone condensation product having a molecular weight of at least 500, and containing a plurality of groups —R—SO$_2$—Ar— in which R represents the paraffin wax radical and Ar represents the polynuclear aromatic hydrocarbon, hydrolyzing and removing residual catalyst, and distilling the reaction products under reduced pressure to obtain the high molecular weight condensation product as distillation residue.

8. A condensation product, having an average molecular weight of at least 500, of a polynuclear aromatic hydrocarbon and a paraffin wax sulphonyl chloride having at least two chlorine atoms obtained by a Friedel-Crafts condensation wherein a final reaction temperature ranging from 100 to 400° F. is maintained.

9. An oil soluble product having a molecular weight range from 500 to 5,000 and substantially non-volatile up to 400° F. under reduced pressure comprising essentially polymeric sulfone condensation products of a paraffin wax sulphonyl halide and a polynuclear aromatic hydrocarbon, said product being obtained by a Friedel-Crafts condensation having a final reaction temperature in the range 100 to 400° F.

10. A product according to claim 9 having wax-modifying properties and comprising essentially an aluminum chloride catalyst condensation product of a paraffin wax sulphonyl chloride containing from 6 to 8% sulfur and from 8 to 12% chlorine with naphthalene.

EUGENE LIEBER.
ALOYSIUS F. CASHMAN.

REFERENCES CITED

The following references are of record in the file of this patent:

UNITED STATES PATENTS

| Number | Name | Date |
|---|---|---|
| 1,981,109 | Klamroth | Nov. 20, 1934 |
| 2,010,754 | Felix | Aug. 6, 1935 |
| 2,017,004 | Kristahler | Oct. 8, 1935 |
| 2,142,934 | Bruson et al. | Jan. 3, 1939 |
| 2,147,346 | Johnson | Feb. 14, 1939 |
| 2,193,824 | Lockwood | Mar. 19, 1940 |
| 2,224,964 | Huismann | Dec. 17, 1940 |
| 2,257,969 | Loane | Oct. 7, 1941 |
| 2,268,062 | Simons | Dec. 30, 1941 |
| 2,288,282 | Huismann | June 30, 1942 |
| 2,318,629 | Prutton | May 11, 1943 |

OTHER REFERENCES

Suter, "Organic Chemistry of Sulfur," Wiley, N. Y., 1944, page 673.

Suter, "Organic Chemistry of Sulfur" (1944), pp. 673 to 675 and 746.

Hackh, "Chemical Dictionary," 3rd edition (1944), page 673.

Boeseken et al., "Rec. Travaux Chimiques Des Pays Bas," vol. 33 (1914), page 321.